(12) United States Patent
Suzuki

(10) Patent No.: US 6,744,031 B1
(45) Date of Patent: Jun. 1, 2004

(54) HIGH SPEED SAMPLING CIRCUIT

(75) Inventor: Haruyuki Suzuki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 207 days.

(21) Appl. No.: 09/994,593

(22) Filed: Nov. 27, 2001

(51) Int. Cl.[7] .............................. G01J 1/20; G11B 7/00
(52) U.S. Cl. ..................... 250/205; 250/201.5; 369/116
(58) Field of Search .............................. 250/205, 201.2, 250/201.4, 201.5, 216; 369/44.25, 44.41, 116, 13.25, 13.26

(56) References Cited

U.S. PATENT DOCUMENTS

| | | | |
|---|---|---|---|
| 5,355,360 A | | 10/1994 | Kawashima |
| 5,453,607 A | * | 9/1995 | Ando et al. ............... 250/201.5 |
| 5,559,769 A | * | 9/1996 | Ando et al. ............... 369/44.27 |
| 5,636,197 A | | 6/1997 | Tateishi |

FOREIGN PATENT DOCUMENTS

| | | |
|---|---|---|
| EP | 1 033 705 A2 | 9/2000 |
| JP | 9-270128 | 10/1997 |

* cited by examiner

*Primary Examiner*—Kevin Pyo
(74) *Attorney, Agent, or Firm*—Dickstein Shapiro Morin & Oshinsky LLP

(57) ABSTRACT

A light intensity control apparatus for use in an information recording and reading system includes a light source driving device for driving a light source so as to generate a light having the first and higher second light intensity levels. A light intensity detection device is provided and includes a first light intensity detection member for detecting a prescribed intensity level of the light when a light modulation speed is relatively low, and a second light intensity detection member for detecting an average of the intensity of the light when it is relatively high. A detection member selection device is provided so as to select one of the first and second light intensity detection members depending upon a selection instruction so as to use one of the detection outputs. A reference level selection device is provided so as to select one of the first and the second reference levels to be compared with the one of the detection results depending upon the selection instruction. A comparison device may be provided so as to compare the one of detection results with a corresponding one of reference levels. A driving current adjustment device is provided in order to adjust the magnitude of a driving current that drives the light source in accordance with the comparison result.

26 Claims, 6 Drawing Sheets

FIG. 5

| WD1 | WD2 | SW1 | SW2 | SW3 |
|---|---|---|---|---|
| L | L | ON | OFF | OFF |
| H | L | OFF | OFF | ON |
| L | H | OFF | ON | OFF |
| H | H | – | – | – |

HIGH SPEED SAMPLING CIRCUIT

BACKGROUND OF THE INVENTION

The present invention relates to an information recording apparatus, such as an optical disc drive, that records information in a recordation medium, such as a CD-R/RW disc, and in particular, to a light intensity control apparatus that controls power of a light generated from a light source such as a semiconductor laser.

Recently, an information recording apparatus capable of recording information in a recordation medium, such as a CD-R/RW disc, is in widespread use. For example, Japanese Patent Application Publication No. 7-44885 refers to an information recording apparatus, where the first, third and fourth levels of light intensity (P1, P3, and P4) are set as optical output levels of a semiconductor laser. In addition, the remaining second intensity level (P2=P1+P4−P3) can be set from the three lower optical intensity levels (P1, P3, and P4) as a peak value of a recordation pulse light because the optical intensity value P3 is smaller than P1, and the following inequality is accordingly established:

$$P4<P2, P3<P4<P2$$

As a result, an unnecessary signal (i.e., signal higher than P2) can be avoided from being recorded in the recordation medium. Accordingly, unnecessary deterioration of the semiconductor laser can be avoided.

Further, when recording some information in an optical disc, an optical disc apparatus as an information recording apparatus generally modulates a recordation laser beam with a higher recordation power (i.e., a higher optical output level) than when reading information.

When utilizing a writable optical disc, such as a CD-R (Compact Disc Recordable) disc, having an organic colorant recordation coat on a recordation surface, the semiconductor laser light source alternately generates light beams having light power levels P1 ("read" intensity) and P2 ("write" intensity), where P2 is an optical output light power level higher than P1. As a result, a "pit" is created on a portion of the recordation surface when the laser light beam is irradiated at the generated light power level P2, and a "space" remains on another portion when the other portion is irradiated by the generated light power P1. Further, the P3 level, which is higher than the P2 level, is generally utilized and a recordation power wave sometimes is formed to include three different values having P1, P2, and P3 levels. The P3 level is positioned at a pit top portion so as to make a pit edge sharp.

When a rewritable and phase changeable type recordation medium, such as a CD-RW (Compact Disc Rewritable) disc, is utilized, these three optical output power levels are also used. Specifically, a portion irradiated by a laser beam on a recordation surface portion is generally made amorphous (non-crystal) when the generated light power P3 and P1 levels are repeatedly utilized at high speed. In contrast, a crystal portion is made on the recordation surface when the P2 level is maintained. These crystalline and amorphous portions can correspond to information data.

To control these several modulation intensity levels, a sampling circuit is generally utilized. When the generated light intensity levels P1 and P2 for the CD-R are utilized, the P2 level is sampled and is generally compared with a prescribed reference value. Then the laser current carried through the semiconductor laser light source is controlled based upon the result of the comparison.

Thus, the generated light power is controlled so that the P2 level can equal a prescribed reference level (i.e., target level). In addition, since the P1 level corresponds to reading power, the magnitude of laser current carried during reading generally is stored for later use.

In the above-described information recording apparatus, when the modulation speed becomes extremely high along with an increase in a recordation speed, the time period of the P2 level becomes extremely short. As a result, a high speed sampling circuit is required. However, it generally is difficult to provide such a high speed sampling circuit, or costly if provided. In addition, if a less expensive sampling circuit is utilized, the recordation light power is not precise.

SUMMARY OF THE INVENTION

An object of the present invention is to address and resolve the above and other problems and provide a new image processing apparatus. The above and other objects are achieved according to the present invention by providing a novel light intensity control apparatus including a light source driving device that drives a light source by the first and second light intensity levels, a light intensity detection device that detects intensity of a light generated from the light source, a comparison device that compares the light intensity with the first and second reference levels, and a driving current adjustment device that adjusts magnitude of a driving current that drives the light source in accordance with a result of the comparison.

In another embodiment, the light intensity detection device includes a first light intensity detection member that detects intensity of the light generated by the second light power level when an operational speed is relatively low, and a second light intensity detection member that detects an average of the intensity of the light when an operational speed is relatively high.

In yet another embodiment, a light intensity detection member selection device is provided so as to select one of the first or second light intensity detection devices based upon a selection instruction so as to select one of the detection outputs.

In yet another embodiment, the comparison device includes a reference level selection device that selects one of the first and the second reference levels in accordance with the selection instruction.

In yet another embodiment, the selection instruction indicates a digital modulation speed of the light source.

In yet another embodiment, the selection instruction controls the detection member selection device to select the first light intensity detection member and the reference level selection device to select the first reference level, correspondingly, when the digital modulation speed is relatively low.

In yet another embodiment, the selection instruction controls the detection member selection device to select the second light intensity detection member and the reference level selection device to select the second reference level when the digital modulation speed is relatively high, where the high speed is higher than the low speed.

In yet another embodiment, the light source driving device drives a light source by all of the first, second, and third light intensity levels.

In yet another embodiment, the driving current adjustment device adjusts the magnitude of the driving current so that the light source generates a light power intensity level having the second reference level based upon the result of the comparison when the light source is driven by the second light generation level.

In yet another embodiment, the driving current adjustment device adjusts the magnitude of the driving current in accordance with the performance derived from the first and second generated light levels when the light beam is generated at the third light intensity level.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a chart for illustrating a table included in the driver for showing a relation between a control logic signal and an input signal.

DETAILED DESCRIPTION OF THE PREFERRED EMBODIMENTS

Figure 1:
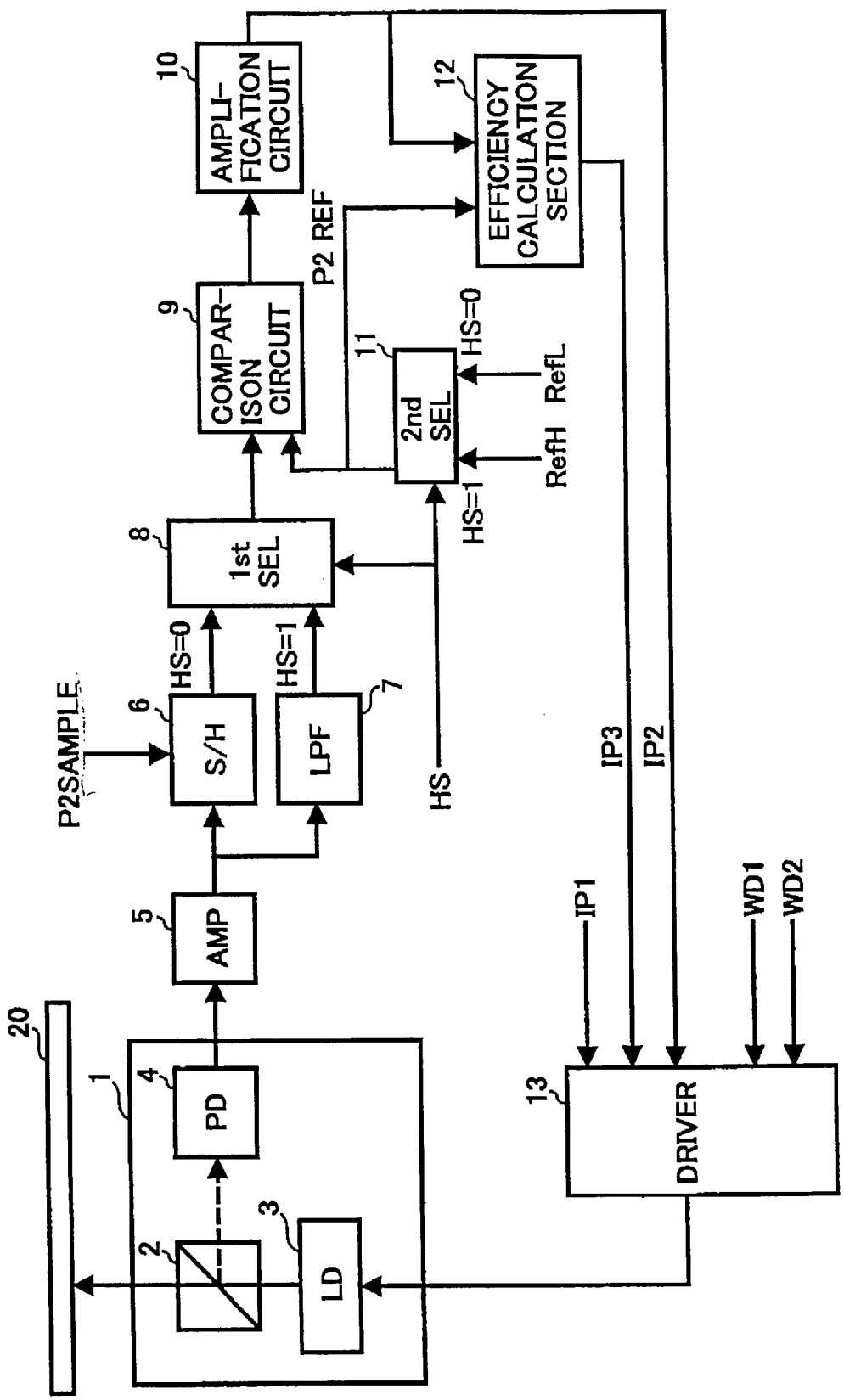
FIG. 1 is a block chart for illustrating a configuration of one embodiment of a laser power control circuit provided in an optical disc apparatus according to the present invention.

Embodiments of the present invention will now be described with reference to the drawings, wherein like reference numerals and marks designate identical or corresponding parts throughout several views. FIG. 1 shows an information recording apparatus which may be provided so as to record and reproduce information by condensing a laser beam, generated from a semiconductor laser light source, on a recordation coat formed on an optical disc 20, such as a CD-R or CD-RW. A laser power control circuit may be provided to control recordation power (i.e., generated light power) of the semiconductor laser light source when information is recorded and reproduced.

One example of a recordation system and its operation performed in the laser power control circuit by utilizing two different light intensity levels is now described. A pickup 1 may include: a prism 2, a semiconductor laser light source (LD) 3, and a photodetector (PD) 4. The ID 3 may produce a laser light beam generated with a prescribed light generation power in correspondence with a driving current carried from the driver 13. The laser beam may be transmitted to an optical disc 20 and to the PD 4 after being reflected through the prism 2. When receiving the laser beam from the prism 2, the PD 4 may perform a photo-electronic conversion and output a signal in accordance with the magnitude of the laser beam. Thus, PD 4 may function as detecting and monitoring the value of the generated light power of the laser beam. The pickup 1 may also include an objective and another optical detector capable of receiving a reflected light, or the like. However, each of sections thereof and conventional sections not directly related to the present invention are neither described nor illustrated in the drawings.

An amplifier (Amp) 5 may amplify a generated light power monitor signal indicating the magnitude of generated light power after the photo-electronic conversion by the PD 4. The generated light power monitor signal may then be input to both a samplehold circuit (S/H) 6 and a low pass filter (LPF) 7 that is a low band filter device. The S/H 6 may sample a generated light power monitor signal when a sampling pulse signal (P2SAMPLE) is generated, and hold the corresponding light intensity level data.

Figure 2:
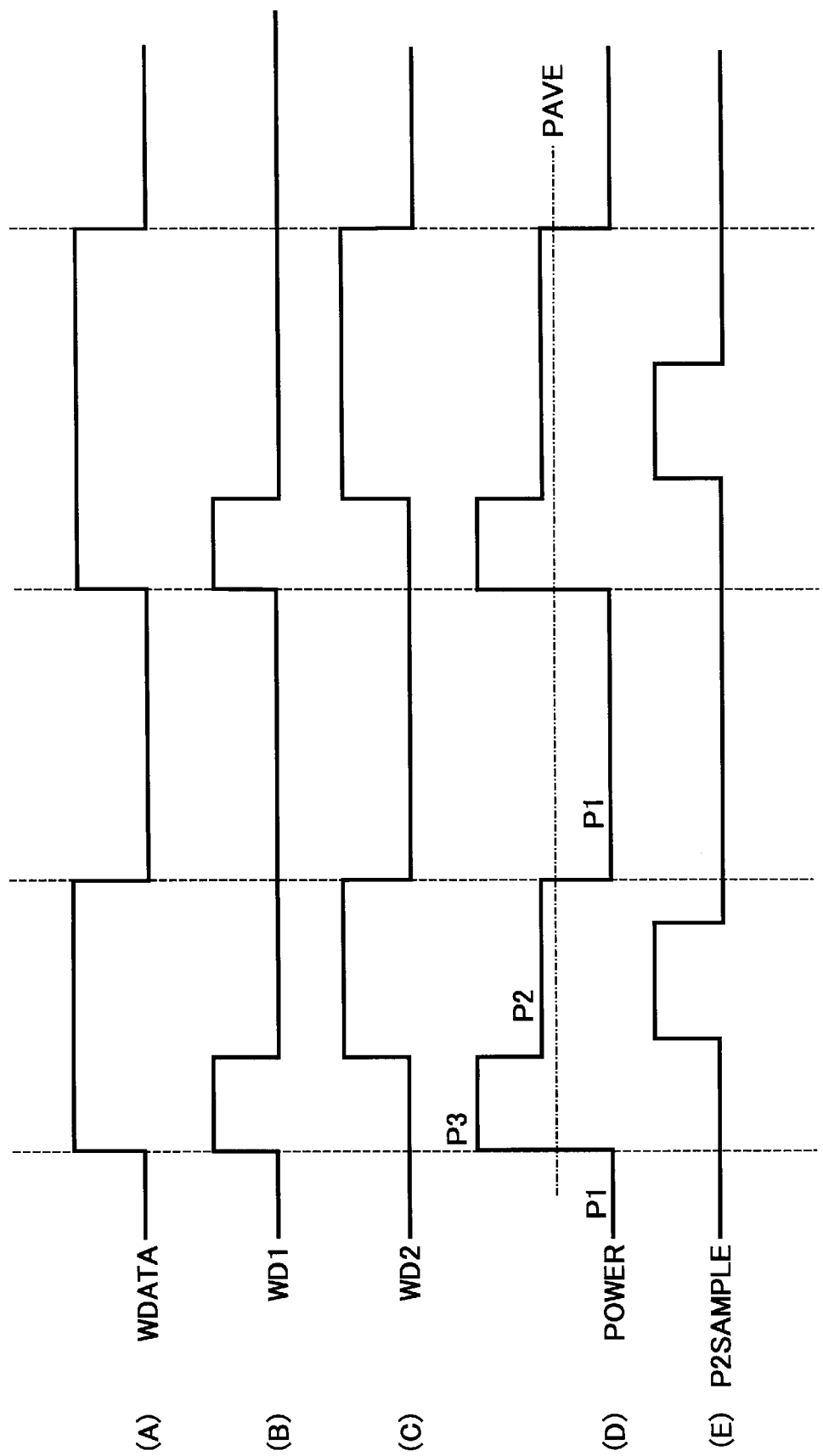
FIG. 2 is a chart for illustrating a variety of signal waves utilized when light generation control is performed for a CD-R by a laser power control circuit illustrated in FIG. 1.

As illustrated in FIG. 2(d), when a CD-R disc is utilized, the sampling pulse signal (P2SAMPLE) may be generated and input to the S/H 6 at a portion of the second light intensity level P2 higher than the P1 that is a minimum light intensity level enabling the LD 3 to generate a light beam for reading. When the CD-RW is utilized, the sampling pulse signal (P2SAMPLE) may be generated at the second light power intensity level P2 of the generated light power for erasing (it is referred to as a recordation power level similar to the P2 level for the CD-R).

Figure 3:
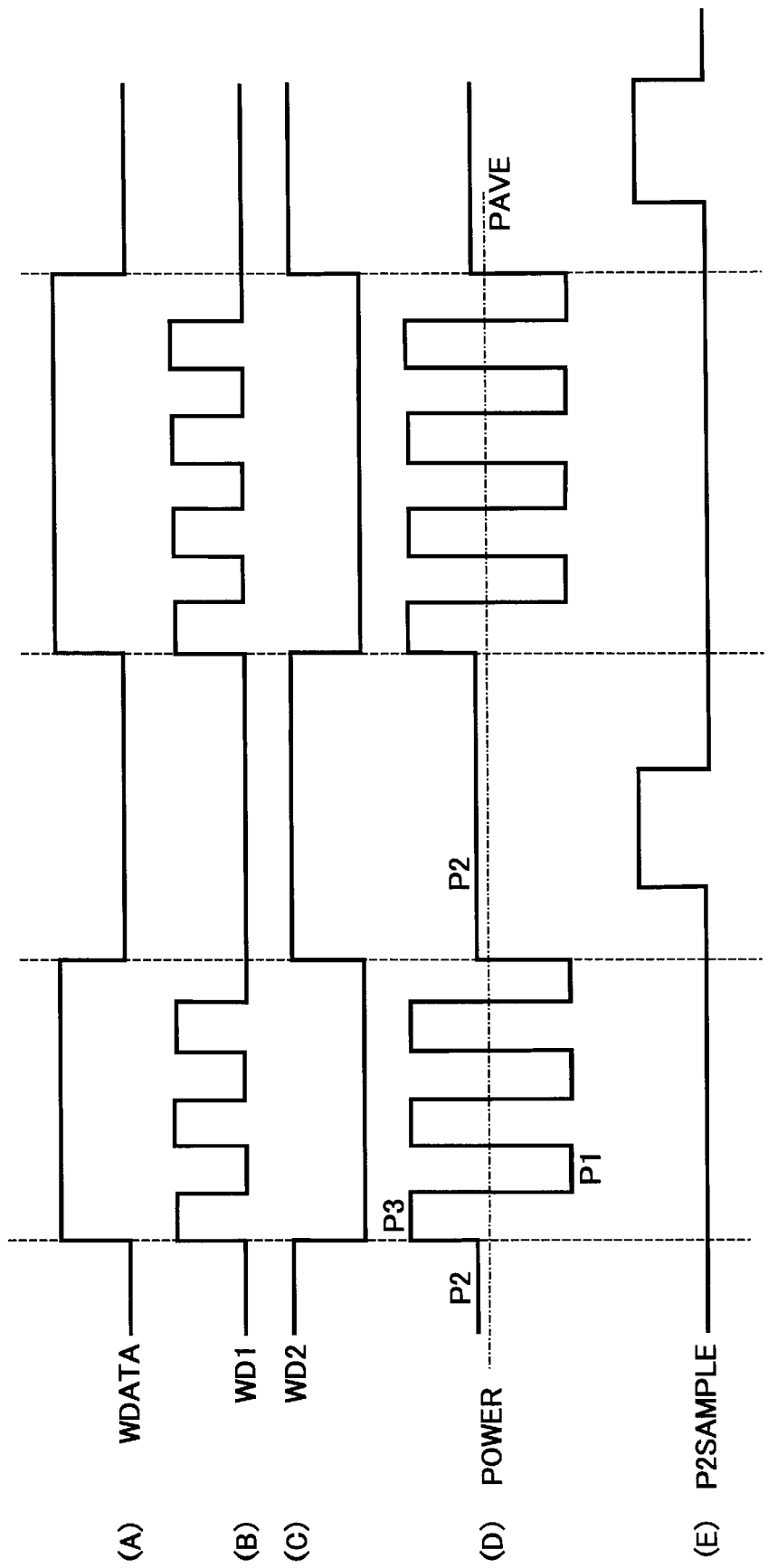
FIG. 3 is a chart for illustrating a variety of signal waves utilized when light generation control is performed for a CD-RW by a laser power control circuit illustrated in FIG. 1.

The second light intensity level P2 may be higher than the generated light level P1 for reproduction use. Thus, when a CD-RW disc is utilized and a high speed modulation is performed between the third light intensity level P3 higher than the second light intensity level P2 and the first generated light level P1 as illustrated in FIG. 3, a recordation coat may become amorphous, and accordingly, a recordation mark may be formed. When the second light intensity level P2 is transmitted, it transforms the recordation coat into a crystal, thereby forming an erasing mark in a manner known in the art.

When a CD-R disc is utilized, a recordation mark may be formed on a recordation surface of an optical disc 20 when the second light intensity level P2 is transmitted to the recordation surface. A space may remain on the recordation surface if the first light intensity level P1 is used when reproducing. In addition, by positioning the third light intensity level P3 at the top of light intensity level P2, as illustrated in FIG. 2(d), the front edge of the recordation mark may be made sharp, as known in the art. Thus, the S/H 6 may output a prescribed signal in accordance with the second light intensity level P2.

The LPF 7 may allow passage of a low band part of the generated light power monitor signal. Thus, the LPF 7 may detect an average of generated light power output from the PD 4. As illustrated in FIG. 2(d), when the CD-R disc is utilized, since an average (PAVE) of the generated light power exists in the vicinity of the dotted line, the output of the LPF 7 may also be at such a level. In contrast, as illustrated in FIG. 3(d), when the CD-RW disc is utilized, such an output may be at a level in accordance with the average (PAVE).

Otherwise, the average (PAVE) can be calculated from the third to first light intensity levels (P3, P2, and P1) if an average duty of a recordation mark and a space (i.e., an erase mark) is constant, and timings of the generation of light power from the third to first light intensity levels (P3, P2, and P1) (i.e., modulation timing) are known. For example, if each of the levels P3 and P2 is 10 mW, the level P1 is 1 mW, and the average duty is 50%, the average can be calculated as:

$$PAVE = (10 \times 0.5) + (1 \times 0.5) = 5.5 \text{ mW}$$

Thus, the above-described PD 4, Amp 5, S/H 6, LPF 7, and first selector (SEL) 8 may constitute the generated light power detection device according to the present invention. The S/H 6 may serve as a detection member for detecting a value of the first generated light power. The LPF 7 may serve as a detection member for detecting the second generated light power. In addition, the first SEL 8 may serve as a detection member selecting device.

The first SEL 8 may select any one of outputs from the S/H 6 and the ILPF 7 depending upon a selection instruction (i.e., selection of High Speed: HS). In particular, if the digital modulation speed of the LD 3, and accordingly, a speed of recordation in the optical disc 20 is relatively low, the selection instruction HS may be zero (HS=0). Then, the first selector 8 may select and output an output signal from the S/H 6 to the comparison circuit 9.

In contrast, if the digital modulation speed, and accordingly, the recordation speed are relatively high, the selection instruction HS may be one (HS=1). The first selector 8 may select and output an output signal from the LPF 7 to the comparison circuit 9. Thus, when an operation is performed at high speed, instead of using the S/H 6, a monitor signal that indicates an average power obtained by the LPF 7 may be utilized. Then, the comparison circuit 9 may compare a generated light power monitor signal that is output from the first selector 8 with a reference level (P2REF) that is output from a second SEL 11. The comparison circuit 9 may then output a signal that indicates the results of the comparison. The reference level (P2REF) may be a target level that the generated light power monitor signal reaches so as to control the generated light power of the LD 3.

Thus, the comparison circuit 9 and the second SEL 11 may constitute the comparison device according to the present invention. The second SEL 11 may serve as the reference level selection device. In addition, the second SEL 11 may select and output to the comparison circuit any one of the first reference level RefL and the second reference level RefH as a reference level (P2REF) depending upon the selection instruction (HS).

Specifically, the second SEL 11 may select and output to the comparison circuit 9 the first reference level RefL if the selection instruction HS indicates a low speed (i.e., HS=0). In contrast, the second SEL 11 may select and output to the comparison circuit 9 the second reference level RefH if the selection instruction HS indicates a high speed (i.e., HS=1).

Since the first reference level RetL is selected when the sample hold value of the second light intensity level P2 is selected as a generated light power monitor signal, a prescribed level, corresponding to the second light intensity level P2, may be set to RefL. Since the second reference level RefH is selected when an average value is selected as a generated light power monitor signal, a prescribed level, corresponding to the average intensity level, may be set to the RefH.

The amplification circuit 10 may amplify the comparison result indication signal that is output from the comparison circuit 9. A signal IP2 (described later in detail) may be output from the amplification circuit 10 and then input to the driver 13. When a recordation pulse WD2 is formed from write data (WDATA) and input as high level ("H" then the driver 13 may carry a driving current having magnitude in proportion to the output signal IP2 through to the LD 3. When the pulse WD2 is a low level ("L" then the driver 13 may carry a driving current having magnitude in proportion to the level of the input signal IP1 through to the LD 3.

Thus, generated light power of the LD 3 can be adjusted. Accordingly, the driver 13 may serve as the light source driving device and driving current adjusting device according to the present invention.

Further, the above-noted selection instruction may control the generated light detection member selection device to select the first generated light power detection member and the reference level selection device to select the first light reference level (i.e., RefL) when a digital modulation speed of the light source is relatively low. Moreover, it may control the second generated light detection member selecting device to select the power level detection device and the reference level-selecting device to select the second light reference level when a digital modulation speed of the light source is relatively high.

In the above-described laser power control circuit, for a level of the input signal IP1, an appropriate laser current may preferably be stored during reproduction (i.e., the LD 3 is generating a light beam at the first light intensity level P1) and then given when recordation is performed. A conventional control device, not illustrated in drawings, may be provided to control reproduction power to be constant at the first- light intensity level P1. For example, a generated light power monitor signal of the first light intensity level P1 may be compared with the reference level and then amplified. The generated light power monitor signal may then be given to the driver 13 as input signal IP1. Such an input signal IP1 may preferably be stored in an appropriate memory. For example, the input signal IP1 can be stored by digitizing it to an A/D converter, holding it in a latch circuit, and then converting it back into analog by the D/A converter using known techniques in the art.

Another example of a recordation control operation performed in this laser power control circuit using three different light intensity levels is now described. The interior configuration of the driver 13 of this example may be illustrated in FIG. 4. Specifically, the first to third current sources 22, 23, and 24, may be provided to respectively generate a driving current having a proportional magnitude to each level of the control-input signals, IP1, IP2, and IP3. The first to third switches 25, 26 and 27, may be opened and closed by control logic signals SW1, SW2, and SW3 generated by the logic section 21 in accordance with the combinations of input signals WD1 and WD2. The logic section 21 may be configured to switch over and carry a driving current to the LD 3 so that the LD 3 can generate a laser beam having prescribed magnitude of generated light power corresponding to the first to third light intensity levels P1 to P3 based upon the input signals WD1 and WD2.

FIG. 5 provides an example table showing the relationship between the different statuses of the control logic signals SW1 to SW3 and input signals WD1 and WD2. When both of input signals WD1 and WD2 are both low states ("L" , the control logic signal switch SW1 may be turned ON and a driving current having magnitude corresponding to the control input signal IP1 (i.e., the first light intensity level P1) may be carried to the LD 3. When the input signals WD1 and WD2 are high state ("H" and low state, respectively, the control logic signal switch SW3 may be turned ON and a driving current having magnitude corresponding to the control input signal IP3 (i.e., the third light intensity level P3) may be carried to the LD 3. When the input signals WD1 and WD2 are in the state of "L" and "H", respectively, the control logic signal switch SW2 may be turned ON and a driving current having magnitude corresponding to the control input signal IP2 (the second light intensity level P2) may be carried to the LD 3.

Even though the driver 13 carries the driving current corresponding to the first to third light intensity levels, P1 to P3, in the above-described embodiment, an operation using only the first and second light intensity levels P1 and P2 (i.e., two) may be sufficient if a sufficient recordation performance of the recordation coat can be attained. For example, two levels of light intensity may be enough for a recordation coat of a certain type of an organic colorant—such as a CD-R disc. Since three levels are generally required for a phase change recordation coat, such as a CD-RW disc, the three levels of light intensity may be appropriate. When only the two levels are utilized, it is desirable that the input signal WD1 is maintained at a low level ("L", and a signal substantially the same as the recordation data WDATA is input for the input signal WD2.

Even though the above-described embodiments exemplify a situation where any one of the control logic signal switches SW1 to SW3 is turned ON, the driving current, having magnitude corresponding to any one of the first to third control input signals IP1 to IP3, is carried to the LD 3, the present invention is not limited to those examples and a below described current accumulation type may be employable. Specifically, for the first light intensity level P1 (corresponding to the control input signal IP1) the first control logic signal switch SW1 may be turned ON. For the second light intensity level P2 (corresponding to the sum of the control input signals IP1 and IP2) the first and second control logic signal switches SW1 and SW2 may simultaneously be turned ON. Further, for the third light intensity level P3 (corresponding to the sum of the control input signal IP1, IP2, and IP3), the first, second and third control logic signal switches SW1, SW2, and SW3 may simultaneously be turned ON.

Such a current accumulation type may readily be realized if its logic is formed from combinations of the timing of the input signal WD1 and WD2 is appropriately changed in accordance with power level generation timing.

One example of a desirable operation using two level generated light powers (i.e., the first and second light intensity levels P1 and P2) is now described. Initially, the driver 13 may hold a light intensity level corresponding to a driving current carried when the LD 3 is controlled at reproduction power as a control-input signal IP1. Then, the selection instruction HS may be zero (HS=0) when the recordation speed is relatively low. Otherwise, the selection instruction HS may be one (HS=1) when the recordation speed is relatively high. In addition, the input signal WD1 may be maintained at a low level ("L" (for the reasons noted earlier). Furthermore, a signal substantially the same as the recordation data pulse WDATA may be input to the driver 13 as an input signal WD2. Then, as described above, a sample value of the second light intensity level P2 or an average value may be selected by the selection instruction HS as a generated light power monitor signal. Simultaneously, the reference level (P2REF) may correspondingly be selected as a target power level. Thus, the second light intensity level P2 of the LD 3 can be controlled at a point around a prescribed target level when a recordation speed is either high or low without employing a high speed sampling circuit.

Another example of a generated light power control operation performed by the third light intensity level P3 is now described. The third light intensity level P3 may be calculated using a laser performance (ratio of power to current). Such a laser performance may be calculated from a level corresponding to the magnitude of a driving current for generating the second light intensity level P2.

Figure 4:
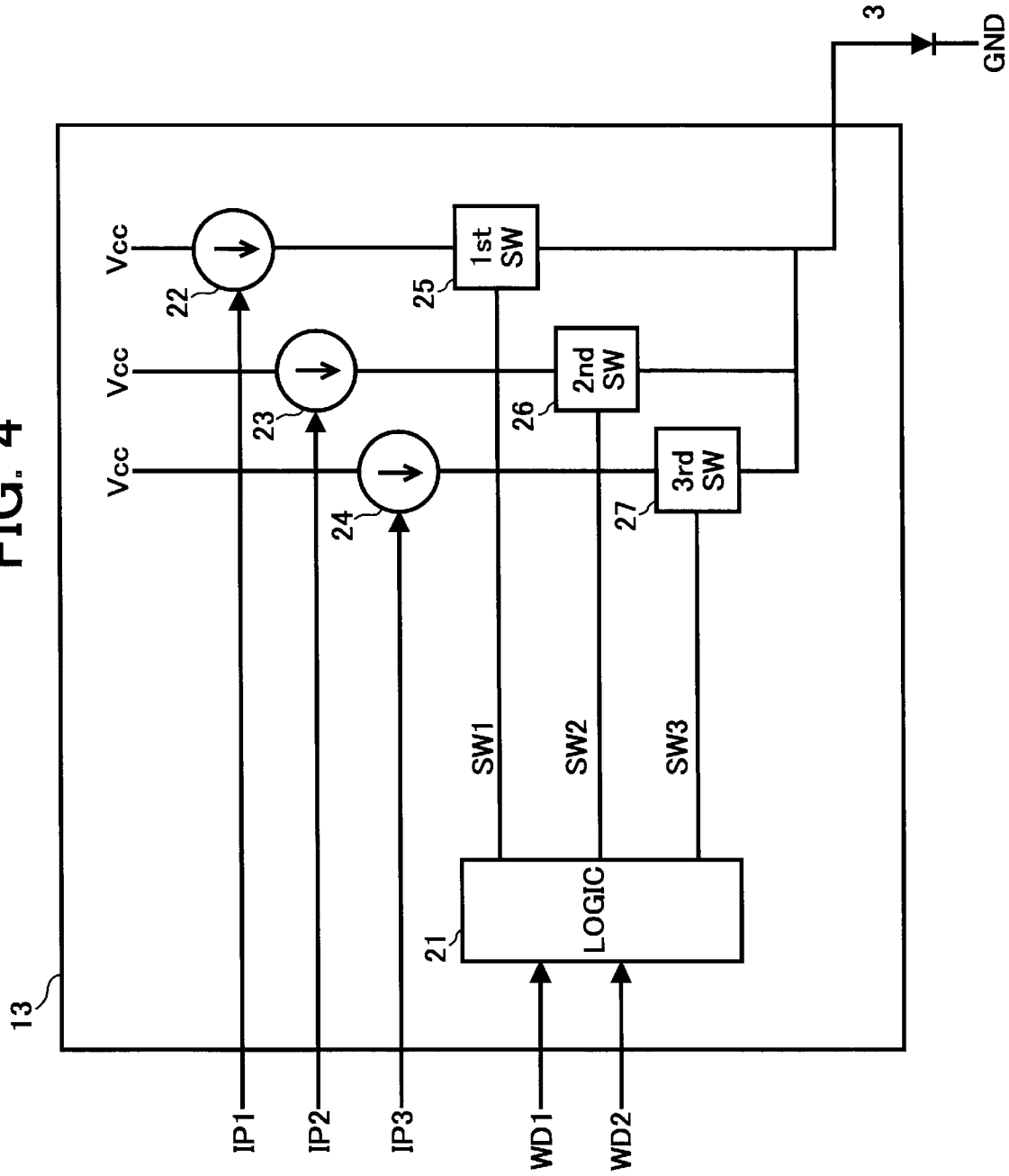
FIG. 4 is a block chart for illustrating an interior configuration of a driver illustrated in FIG. 1.

One example of a method for calculating the laser performance in the performance calculation section 12 is now described. It is initially supposed that the driver 13 is a current switching type as illustrated in FIG. 4. The laser performance can be determined from the control input signal IP2 when the LD 3 generates a light beam, having the second light intensity level P2, and a control input signal IP1, required when the LD 3 generates a light beam having the first light intensity level P1, by employing the following formula:

$$\text{Performance} = (P2-P1)/(IP2-IP1)$$

Figure 6:
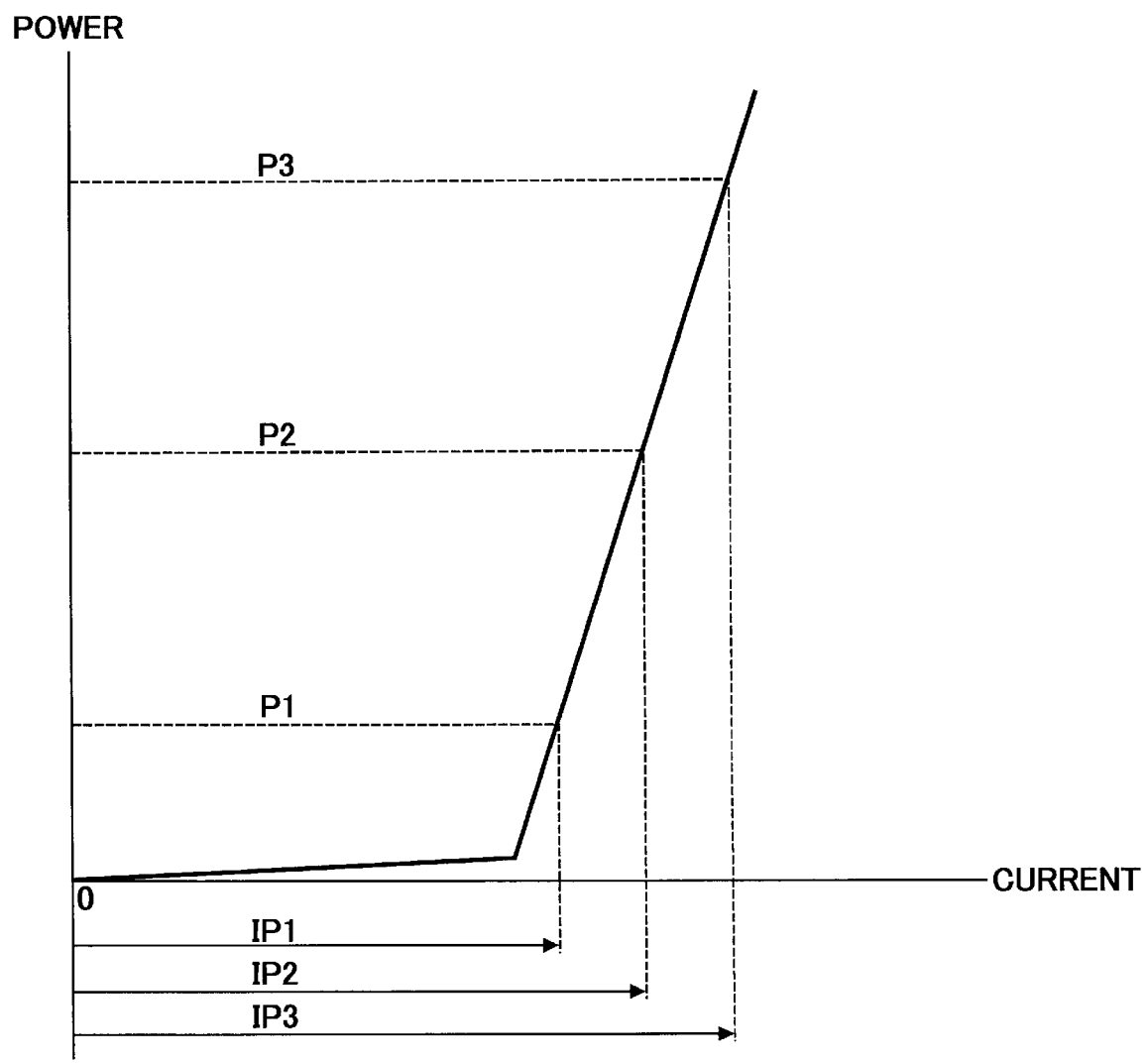
FIG. 6 is a graph for illustrating a relation between current of a laser diode (LD) illustrated in FIG. 1 and recordation power.

As illustrated in FIG. 6, the laser performance may be represented by inclination of a straight line. Thus, a control-input signal IP3 required for the LD 3 to generate a light beam having the third light intensity level P3 may be obtained from the following formula:

$$IP3 = IP1 + (P3-P1)/\text{Performance}$$

As for the control input signal IP2 required for the LD 3 during generation of a light beam at the second light intensity level P2, it is desirable to set the selection instruction to zero (HS=0) and utilize a control input signal IP2 as utilized when the second light intensity level P2 is controlled by sampling. If the laser performance value is once obtained, since a control input signal IP3 corresponding to an optional third light intensity level P3 can be calculated, no problem occurs even when the selection instruction HS is set to one.

In the above-described laser power control circuit of FIG. 1, the voltage current of the reference level (P2REF) is used as the second light intensity level P2 when the performance calculation section 12 calculates the performance. However, the addition of another light level intensity level does not create any problems if it simply corresponds to the second light intensity level P2. Specifically, it is sufficient only to convert a scale between the laser performance and the third light intensity level IP3 when a calculation is performed. It is enough to calculate by converting the first and third light intensity levels, P1 and P3, into substantially the same unit as the reference level (P2REF).

Furthermore, the laser power control circuit of the above-described embodiment can be applied to another system as a device capable of adjusting a driving current and controlling generated light power of a light source.

Furthermore, even though the illustrated driving current is adjusted by two or three values of light intensity levels, the present invention is not limited thereto. Specifically, the drive current may be adjusted to four or more different light intensity levels in the similar manner.

According to these embodiments, since the driving current of the light source is adjusted by switching a sampling monitor to and from an averaged monitor, depending upon a recordation speed, high-speed modulation is available without using a high speed sampling circuit. In addition, a light source control to generate a light beam having prescribed power (i.e., recordation intensity) can be precisely performed in either low speed or high speed recordation. Furthermore, since the generated light power is adjusted by the three light intensity levels, the present invention can be applied to a variety of optical instruments, or the like, as a generated light power control apparatus.

The mechanisms and processes set forth in the present invention may be implemented using one or more conventional general purpose microprocessors and/or signal processors programmed according to the teachings in the present specification, as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits, or by a combination thereof, with one or more conventional general purpose microprocessors and/or signal processors programmed accordingly. The present invention also includes a computer-based product, which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore understood that within the scope of the claims, the present invention may be practiced beyond that which is specifically described herein.

This application claims priority under 35 U.S.C. § 119 to Japanese Patent Application No. 2000-362713, filed on Nov. 29, 2000, the entire contents of which are incorporated herein by reference.

What is claimed as new and desired to be protected by Letters Patent of the United States is:

1. A light intensity control apparatus, comprising:
    a light source driving device configured to drive a light source to generate a light having at least first and a second light intensity levels, said second level being higher than the first level;
    a first light intensity detection device configured to detect the second light intensity level and provide an output;
    a second light intensity detection device configured to detect an average of the intensity of the light and provide an output;
    a light intensity detection device selection device configured to select one of the first and second light intensity detection devices in accordance with a selection instruction;
    a reference providing device configured to provide first and second references of a second light intensity level and an average light intensity level;
    a reference selecting device configured to select one of the first and second references corresponding to a selection instruction;
    a comparison device configured to compare one of the outputs of the first and second light intensity detection devices with the corresponding selected one of the first and second references; and
    a driving current adjustment device configured to adjust a magnitude of a driving current configured to drive the light source in accordance with the comparison result.

2. A light intensity control apparatus, comprising:
    a light source driving device configured to drive a light source to generate a light having at least first, second, and third light intensity levels, said second level being higher than the first, said third level being higher than the second;
    a first light intensity detection device configured to detect the second light intensity level and provide an output;
    a second light intensity detection device configured to detect an average of the intensity of the light and provide an output;
    a light intensity detection device selection device configured to select one of the first and second light intensity detection devices in accordance with a selection instruction;
    a reference providing device configured to provide first and second references of a second light intensity level and an average light intensity level;
    a reference selecting device configured to select one of the first and second references corresponding to a selection instruction;
    a comparison device configured to compare one of the outputs of the first and second light intensity detection devices with the corresponding selected one of the first and second references; and
    a driving current adjustment device configured to adjust a magnitude of a driving current configured to drive the light source in accordance with the comparison result.

3. The light intensity control apparatus according to claim 2, wherein said third light intensity level is generated by determining a performance of the light source referring to the first and second generated light levels.

4. The light intensity control apparatus according to any one of claims 1, 2, and 3, wherein said light reads and/or writes information to and from a recording medium.

5. The light intensity control apparatus according to claim 4, wherein said first light intensity level is used to read information from the recording medium during a reproduction mode.

6. The light intensity control apparatus according to claim 4, wherein said first light intensity level forms a space on a recordation surface of the recording medium during a recordation mode.

7. The light intensity control apparatus according to claim 4, wherein said second light intensity level forms a pit or an amorphous portion on a recordation surface of the recording medium during a recordation mode.

8. The light intensity control apparatus according to claim 4, wherein said second light intensity level is detected by a sampling operation.

9. The light intensity control apparatus according to any one of claims 1, 2, and 3, wherein a reading light intensity is detected and stored during the reproduction mode as said first light intensity level for the recordation mode.

10. The light intensity control apparatus according to any one of claims 1, 2, and 3, further comprising a low pass filter for determining the average light intensity level.

11. The light intensity control apparatus according to any one of claims 1, 2, and 3, wherein said average is calculated from the light intensity levels when an average duty of a mark and space is constant and modulation timing of the light intensity levels are known.

12. The light intensity control apparatus according to any one of claims 1, 2, and 3, wherein said first reference is a prescribed value targeted by the second light intensity.

13. The light intensity control apparatus according to any one of claims 1, 2, and 3, wherein said second reference is a prescribed value targeted by the average light intensity.

14. The light intensity control apparatus according to claim 12, wherein said first reference level is compared with the output of the first light intensity detection device, and said second reference level is compared with the average light intensity value.

15. The light intensity control apparatus according to claim 13, wherein said first reference level is compared with the output of the first light intensity detection device, and said second reference level is compared with the average light intensity value.

16. The light intensity control apparatus according to any one of claims 1, 2, and 3, wherein said selection instruction varies depending upon a digital modulation speed of the light source.

17. The light intensity control apparatus according to any one of claims 1, 2, and 3, wherein said selection instruction controls the light intensity detection device selection device and the reference level selection device to select the first light intensity detection device and the first reference level, respectively, when the digital modulation speed is relatively low.

18. The light intensity control apparatus according to any one of claims 1, 2, and 3, wherein said selection instruction controls the light intensity detection device selection device and the reference level selection device to select the second light intensity detection device and the second reference level, respectively, when the digital modulation speed is relatively high.

19. An information recording system configured to record information in a recording medium by irradiating a light beam from a light source under control of a light intensity control apparatus, said light intensity control apparatus comprising:

a light source driving device configured to drive a light source to generate a light having at least first and second light intensity levels, said second level being higher than the first level;

a first light intensity detection device configured to detect the second light intensity level and provide an output;

a second light intensity detection device configured to detect an average of the intensity of the light and provide an output;

a light intensity detection device selection device configured to select one of the first and second light intensity detection devices in accordance with a selection instruction;

a reference providing device configured to provide first and second references of a second light intensity level and an average light intensity level;

a reference selecting device configured to select one of the first and second references corresponding to a selection instruction; a comparison device configured to compare one of the outputs of the first and second light intensity detection devices with the corresponding selected one of the first and second references; and a driving current adjustment device configured to adjust a magnitude of a driving current configured to drive the light source in accordance with the comparison result.

20. An information recording system configured to record information in a recording medium by irradiating a light beam from a light source under control of a light intensity control apparatus, said light intensity control apparatus comprising:

a light source driving device configured to drive a light source to generate a light having all of first, second, and third light intensity levels, said second level being higher than the first, said third level being higher than the second;

a light source driving device configured to drive a light source to generate a light having at least a first and a higher second light intensity levels;

a first light intensity detection device configured to detect the second light intensity level and provide an output;

a second light intensity detection device configured to detect an average of the intensity of the light and provide an output;

a light intensity detection device selection device configured to select one of the first and second light intensity detection devices in accordance with a selection instruction;

a reference providing device configured to provide first and second references of a second light intensity level and an average light intensity level;

a reference selecting device configured to select one of the first and second references corresponding to a selection instruction;

a comparison device configured to compare one of the outputs of the first and second light intensity detection devices with the corresponding selected one of the first and second references; and a driving current adjustment device configured to adjust a magnitude of a driving current configured to drive the light source in accordance with the comparison result and to generate the third light intensity level by supposing a performance of the light source referring to the first and second generated light levels.

21. The information recording system according to any one of claims 19 and 20, wherein said selection instruction is determined based upon a digital modulation speed of the light source.

22. The information recording system according to any one of claims 19 and 20, wherein said selection instruction controls the detection device selection device and the reference level selection device to select the first light intensity detection device and the first reference level, respectively, when the digital modulation speed is relatively low.

23. The information recording system according to any one of claims 19 and 20, wherein said selection instruction controls the detection device selection device and the reference level selection device to select the second light intensity detection device and the second reference level, respectively, when the digital modulation speed is relatively high.

24. The information recording system according to any one of claims 19 and 20, wherein said information recording system is included in a computer.

25. A method for controlling light intensity, comprising the steps of:

driving a light source so as to generate a light having a first and second, and third light intensity levels, said second level being higher than the first, said third level being higher than the second;

selectively detecting the second light intensity level and an average of the intensity of the light generated from the light source depending upon a modulation speed of the light source;

comparing a first or second target levels with the intensity detected by the second light intensity level or average, respectively; and adjusting a magnitude of a driving current for driving the light source in accordance with the comparison result.

26. A light intensity control apparatus, comprising:

light source driving means for driving a light source in order to generate a light having at least a first and a higher second light intensity levels;

first light power detecting means for detecting the second light intensity level and providing an output;

second light intensity detecting means for detecting an average of the intensity of the light and providing an output;

light intensity detecting means selecting means for selecting one of the first and second light intensity detecting means in accordance with a selection instruction;

reference providing means for providing first and second references of a second light intensity level and an average light intensity level, respectively;

reference selecting means for selecting one of references corresponding to the selection instruction;

comparing means for comparing one of outputs of the first and second light power detection means with a corresponding one of the first and second references; and driving current adjusting means for adjusting a magnitude of a driving current so as to drive the light source in accordance with the comparison result.

* * * * *